United States Patent [19]

Emma

[11] Patent Number: 5,619,665
[45] Date of Patent: Apr. 8, 1997

[54] METHOD AND APPARATUS FOR THE TRANSPARENT EMULATION OF AN EXISTING INSTRUCTION-SET ARCHITECTURE BY AN ARBITRARY UNDERLYING INSTRUCTION-SET ARCHITECTURE

[75] Inventor: Philip G. Emma, Danbury, Conn.

[73] Assignee: Intrnational Business Machines Corporation, Armonk, N.Y.

[21] Appl. No.: 421,344

[22] Filed: Apr. 13, 1995

[51] Int. Cl.$^6$ .................................................. G06F 9/455
[52] U.S. Cl. ...................... 395/384; 395/500; 364/DIG. 1
[58] Field of Search ....................................... 395/375, 500, 395/800, 250; 364/263, 948.3, 230.3, 21.9, 262.4

[56] References Cited

U.S. PATENT DOCUMENTS

| | | | |
|---|---|---|---|
| 4,415,969 | 11/1983 | Bayliss et al. | 364/130 |
| 4,442,484 | 4/1984 | Childs, Jr. et al. | 395/500 |
| 4,841,476 | 6/1989 | Mitchell et al. | 364/900 |
| 5,167,023 | 11/1992 | de Nicolas et al. | 395/375 |
| 5,301,302 | 4/1994 | Blackard et al. | 395/500 |
| 5,392,408 | 2/1995 | Fitch | 395/375 |

FOREIGN PATENT DOCUMENTS

WO91/17496 11/1991 WIPO .
WO94/27214 11/1994 WIPO .

OTHER PUBLICATIONS

PC Week, VII, n46, p. 93(2).
T.R. Halfhill "Intel's P6" Byte Apr. 1995 pp. 42–58.
T.R. Halfhill "Emulation: RISC's Secret Weapon" BYTE Apr. 1994 pp. 119–130.
G.M. Silberman et al, "An Architectural Framework for Migration from CISC to Higher Performance Platforms", Conf. Proceedings, 1992 Int Conf. on Supercomuting, ACM Int. Conf on Supercomputing, Jul. 1992 pp.

*Primary Examiner*—William M. Treat
*Assistant Examiner*—Amare Assefa
*Attorney, Agent, or Firm*—Robert P. Tassinari, Jr.

[57] ABSTRACT

The invention provides means and methods for extending an instruction-set architecture without impacting the software interface. This circumvents all software compatibility issues, and allows legacy software to benefit from new architectural extensions without recompilation and reassembly. The means employed are a translation engine for translating sequences of old architecture instructions into primary, new architecture instructions, and an extended instruction (EI) cache memory for storing the translations. A processor requesting a sequence of instructions will look first to the EI-cache for a translation, and if translations are unavailable, will look to a conventional cache memory for the sequence, and finally, if still unavailable, will look to a main memory.

23 Claims, 9 Drawing Sheets

GENERIC ARCHITECTURE

PURE RISC

PURE CISC

REAL EMULATION

ABSTRACT EMULATION

NEW ARCHITECTURE

EXTENDED ARCHITECTURE

RETROFITTED ARCHITECTURE

EMULATION ARCHITECTURE

METHOD AND APPARATUS FOR THE TRANSPARENT EMULATION OF AN EXISTING INSTRUCTION-SET ARCHITECTURE BY AN ARBITRARY UNDERLYING INSTRUCTION-SET ARCHITECTURE

FIELD OF THE INVENTION

The invention relates to instruction set architectures, and in particular to a system and method for enhancing the flexibility of such architectures.

BACKGROUND OF THE INVENTION

An Instruction-Set Architecture (referred to herein as an "architecture") is the definition of the logical view of a computer as seen by an Assembly Language programmer. It includes a description of the logical storage that can be operated on by an assembly-language program (i.e., the visible memory hierarchy, the addressing structure, I/O devices, and the explicit and implicit registers within the processor). It includes a list of all instructions that can be executed by the assembly-language program (e.g., LOAD, ADD, BRANCH, etc.) with the precise format of each instruction, and a complete description of what the result of executing the instruction will be under all possible circumstances. Finally, it includes a complete description of what can possibly be observed by other processors that are examining the contents of shared storage as a program executes on the processor.

Two processors are said to have the same architecture if the description of their operations given at the level described in the preceding paragraph are the same. A more rigorous statement is as follows: two machines, A and B, have the same architecture if there is no program that can produce an output when run on processor A that could not possibly be an output when run on processor B.

What an architecture specifically does NOT include is a description of the actual hardware in the machine. That is, the architecture does not say how many arithmetic logic units are in the machine, or how fast they are. Many architectures do not make any mention of caches, although the processors that implement the architectures invariably have them.

In short, an architecture is a precise and complete description of the logical operation of a processor, and that logical operation should be independent of performance. All of the other details (number of execution units, caches, etc.) are things that are put into machines to help performance. These things should not alter the logical operation of the processor (i.e., they should not cause programs to generate outputs that could not have been generated were these things not in the processor). An example that captures this notion is as follows. If a person says "this processor executes instructions two-at-a-time," they are making a statement about the processor's implementation. On the other hand, if they say "this processor appears to execute instructions two-at-a-time," then they are making a statement about the processor's architecture. (Of course, this example assumes that there are programs that could produce results when executing instructions two-at-a-time that could not be produced when executing the instructions one-at-a-time. Otherwise, a person could not discern the appearance of two-at-a-time execution.)

In fact, a processor that has the appearance of executing instructions two-at-a-time is most probably nonsensical (if the statement of appearance is meaningful, as described above); that is, it probably does not do what most programmers would be expecting.

Further, in the example above, it is a safe bet that the person who is describing a processor that actually executes instructions two-at-a-time, is describing a processor that appears to execute instructions one-at-a-time. That is, the processor (unless it behaves nonsensically) produces outputs that are consistent with one-at-a-time execution. In fact, a processor that does execute instructions two-at-a-time must have some considerable amount of hardware that is only there to ensure consistency with one-at-a-time execution.

Therefore, when describing the logical appearance of the operation of a processor, we are describing the processor's architecture. The physical implementation of the processor is distinct from this, and is sometimes called the processor's "microarchitecture."

The microarchitecture is a description of the actual workings of the specific hardware of a specific processor. It describes one specific model of machine. On the other hand, the architecture might apply to many models of machines.

The reason that IBM was said to have had such success with the introduction of the 360 architecture in 1964 was that until then, no other company had cleanly defined a hardware-independent definition of the operation of a machine (architecture, as described above). All previous machines had their own hardware-dependent definitions—this meant that software that was developed for one machine could not be used on another machine. The IBM 360 line included some 20 models of different processors (each having a different cost and performance) that were all fully compatible at the assembly-language level.

This meant that customers could buy a machine that suited their performance requirements for a suitable cost, and if their performance requirements subsequently increased, the customer could upgrade to a new model of machine without having to discard the software that he had developed.

The IBM 360 architecture was defined by engineers in the late 1950's and early 1960's who used their best engineering judgement as to what a "good" instruction-set comprised. This involved making cost/performance trade-offs based on the hardware and software technologies of the late 1950's and early 1960's.

Of course, as these technologies evolved, the IBM 360 architecture fell behind. Since the IBM 360 line had been such a strong commercial success, IBM could not merely abandon the architecture; there was a loyal customer-base that had invested large amounts of money and time developing software that ran on this architecture.

Instead, IBM evolved the 360 architecture by defining upward compatible levels of the architecture (meaning that each generation's architecture subsumes the prior generation's architecture). This gave rise to the 370, and the 370 XA, and the ESA 390 architectures. The amount of money that has been spent in developing software for these architectures is thought to be in excess of two trillion dollars as of the early 1990's. Despite the fact that this architectural line is rooted in some things that are now antiquated, a $2,000,000,000,000 legacy is not easily abandoned.

U.S patent application Ser. No. 08/421,272 (IBM Docket No. YO995-057), filed concurrently herewith, which describes a Method and Apparatus for Improving System Performance in a Data Processing System, is incorporated herein by reference.

SUMMARY OF THE INVENTION

The invention is a method for translating a series of one or more instructions of a first semantic type into one or more instructions of a second semantic type, comprising the steps of: providing a first memory; providing a second memory; translating a sequence of instructions of the first semantic type stored in the first memory into one or more primary instructions of the second semantic type and storing the instructions of the second type in the second memory upon a request from the processor for the sequence of instructions of the first semantic type; providing the corresponding instructions of the second semantic type if available in the second memory; providing the sequence of instructions of the first semantic type if the corresponding instructions of the second semantic type are not available in the second memory.

FIGURES

Figure 5:
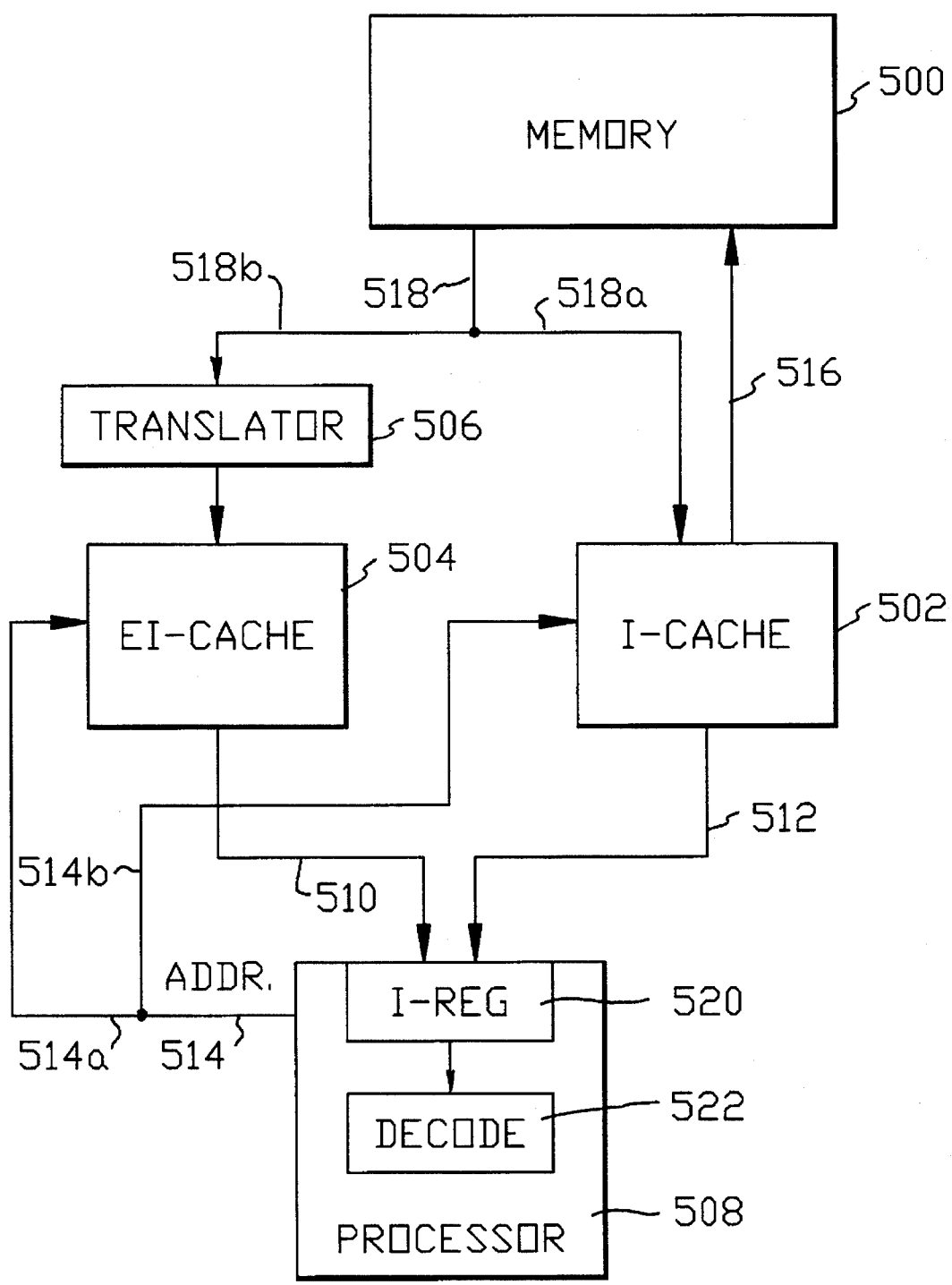
Figure 6:
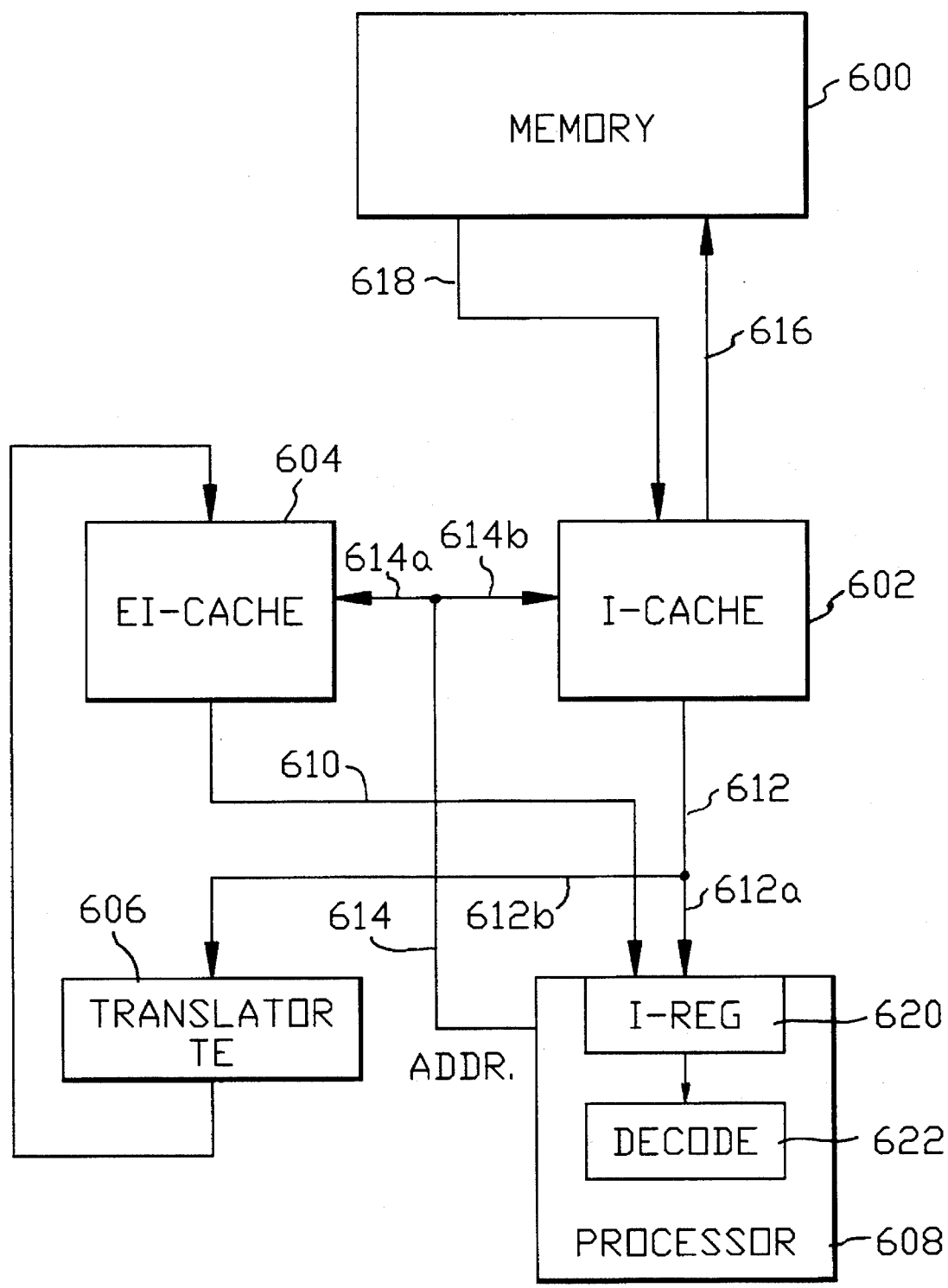
Figure 7:
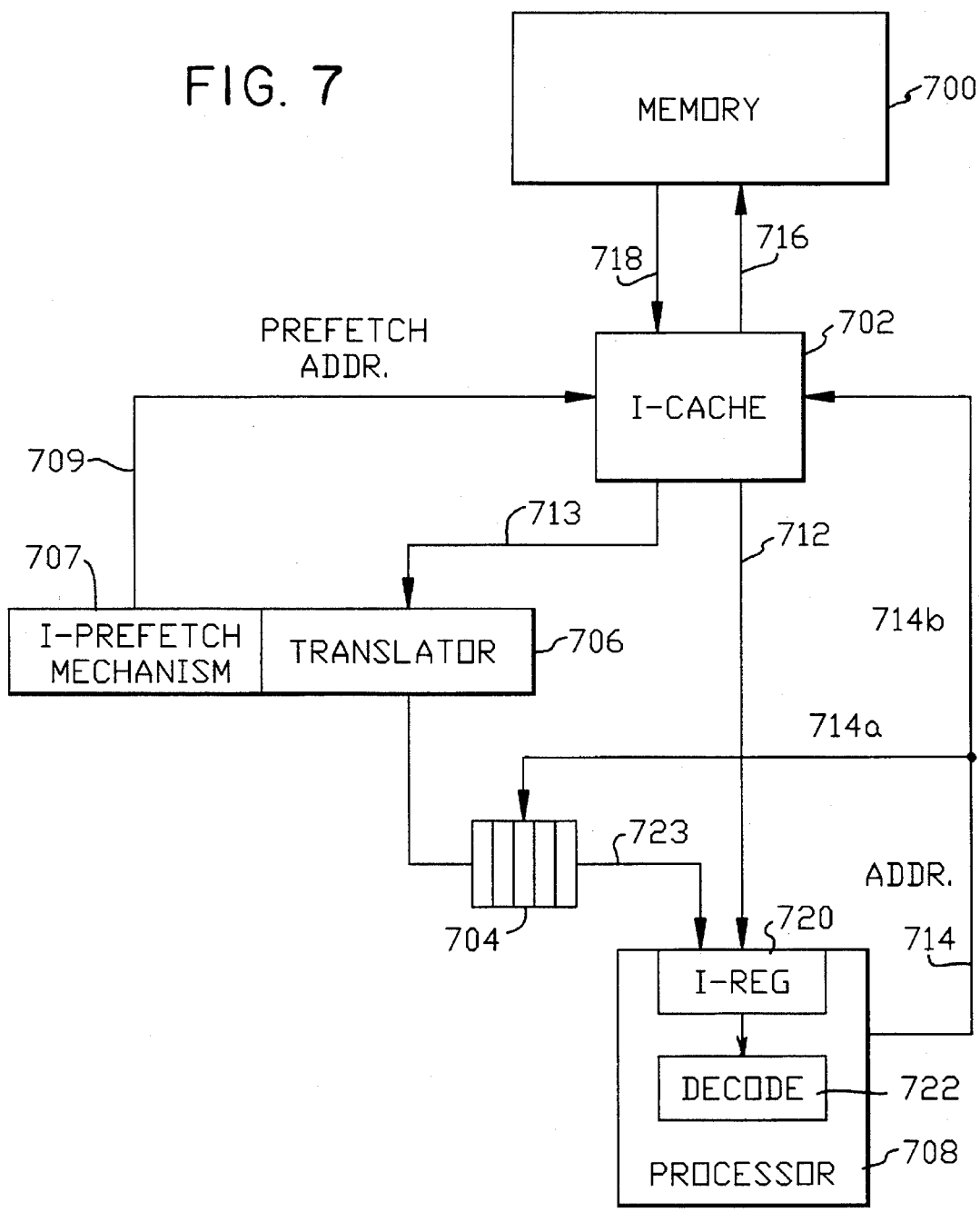

FIGS. 5, 6, and 7 are schematic diagrams of preferred embodiments of the system of the present invention.

Figure 8:
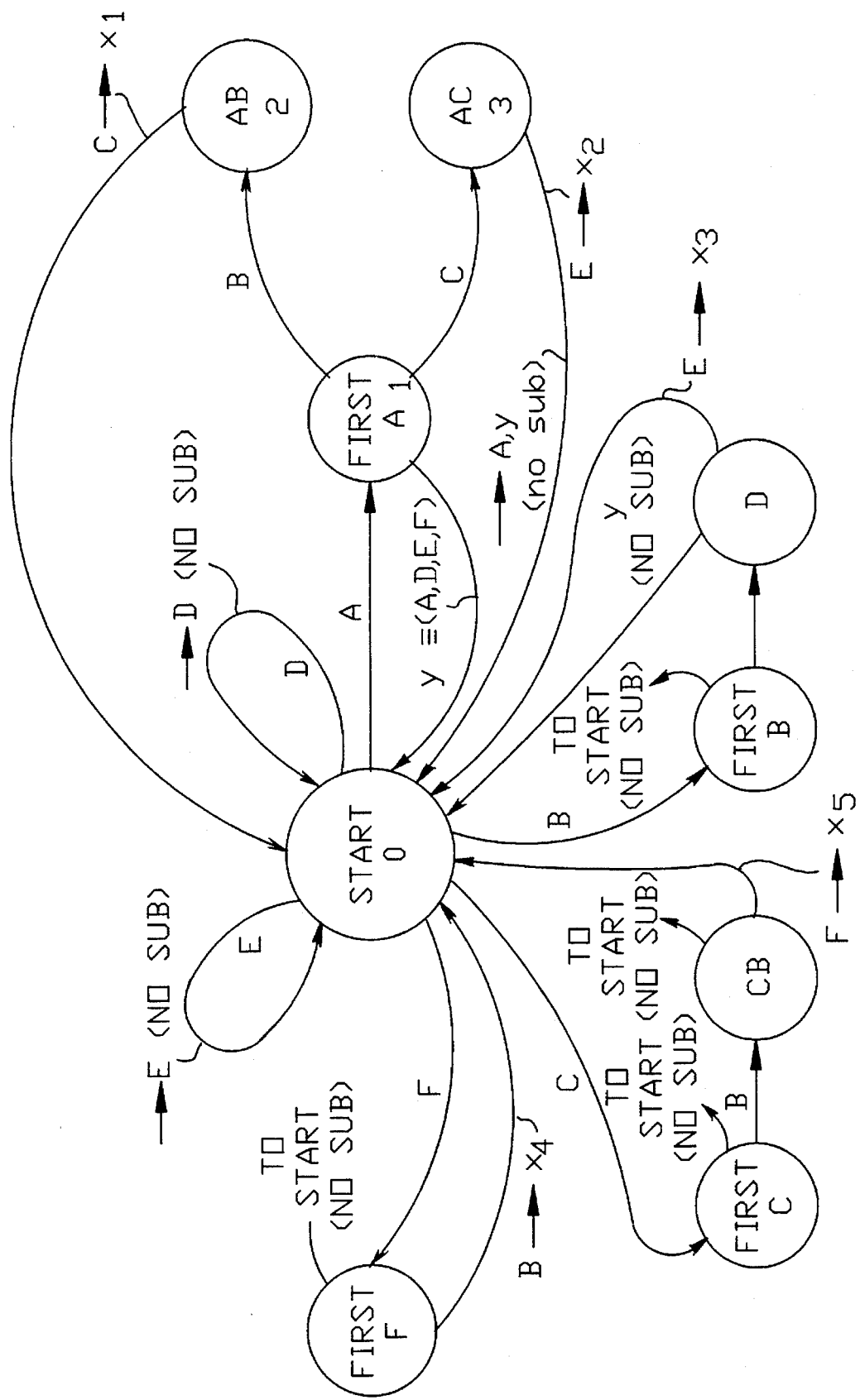

FIG. 8 is a diagram of a finite state machine demonstrating the operation of a translation engine in accordance with one aspect of the present invention.

Figure 9:
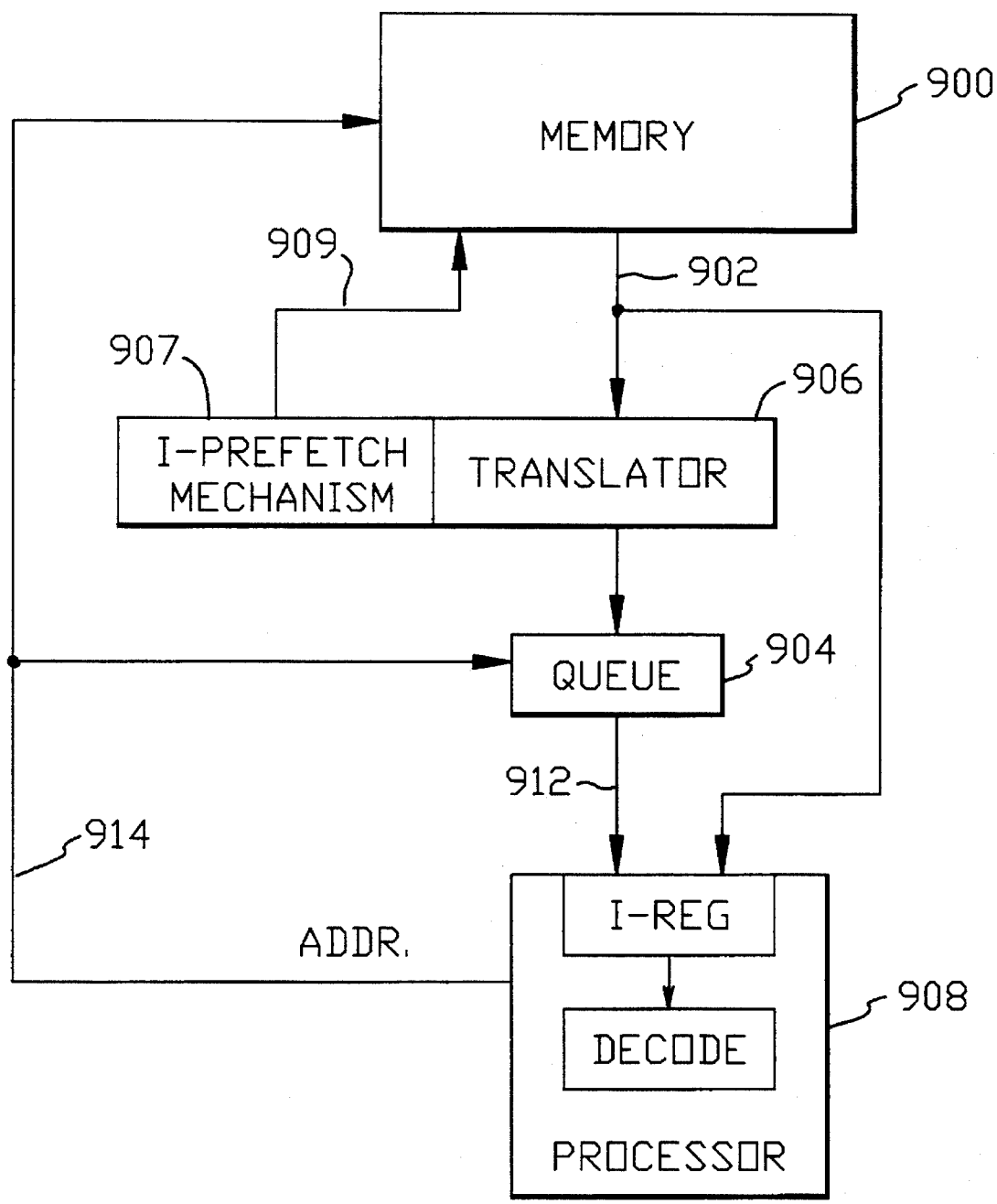

FIG. 9 is a schematic diagram of another embodiment of the present invention.

DETAILED DESCRIPTION

Figure 1A:
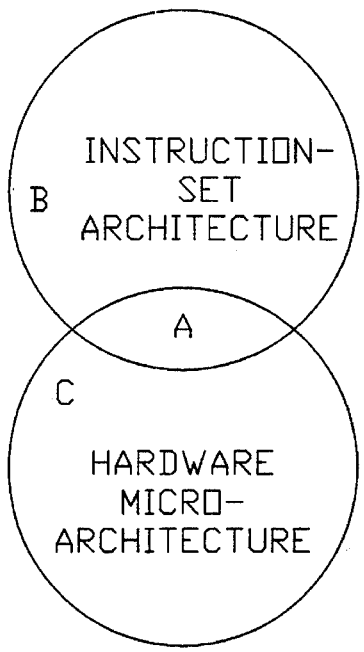
FIGS. 1a, 1b, 1c, 1d and 1e are Venn diagrams demonstrating the relationships between computer languages, architectures and microarchitectures.

FIGS. 1a–1d show various Venn-diagram representations of the relationship between instruction-set architectures, and hardware microarchitectures. Each balloon in the diagrams represents a set of instructions. In FIG. 1a, the balloons overlap. While this is typically the case, other configurations are possible: the two balloons could be coincident, or disjoint, or one could be a subset of the other. Each of the cases shown in FIGS. 1a–1d will now be described.

As shown in FIG. 1a, the hardware microarchitecture (regions A and C) is the microinstruction-set for a specific implementation. These are the actual hardware instructions that a specific machine can directly execute. The instruction-set architecture (regions A and B) is independent of the specific machine; it defines the logical appearance of the machine to the software interface. All software is written (or compiled-to) with this interface in mind.

Region A is the "RISC-core" of the instruction-set architecture. The original philosophy behind RISC architecture was to remove region B from this figure. The design goal was fast hardware with a fast cycle-time. It was felt that the "complicated" instructions (region B) required putting miscellanea into the processor which would impact the critical paths in the machine. It was felt that if an instruction could not be executed natively on the raw hardware, it was not conducive to a fast cycle time.

Figure 1B:
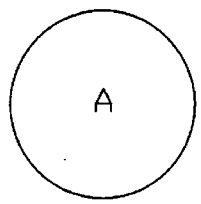

Instead, the function that was performed by those instructions in region B was to be done in software, where the software would all be compiled down to region-A "RISC" instructions. In that scenario, region C also doesn't exist because it doesn't represent anything meaningful. The picture for a pure RISC machine is shown in FIG. 1b.

Figure 1C:
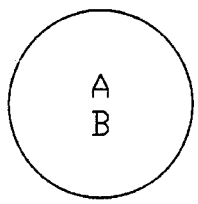

FIG. 1c shows the Venn diagrams for a pure CISC implementation. This figure looks the same as FIG. 1b, except that now the coincident balloons represent regions A and B.

Remember that an application program "sees" performance as the time required to perform a transaction. This is proportional to the product of pathlength (number of instructions required to complete the transaction) and the processing rate (instructions per second) for the processor. The processing rate (usually given in MIPS) is inversely proportional to the product of the cycle-time of the processor, and the average number of cycles required to complete an instruction (called CPI). The RISC philosophy was to omit region B, let CPI=1, and achieve a very fast cycle time while letting the pathlength suffer somewhat (and incidentally, to perform innovative compiler work to try to help this). The CISC philosophy was to implement region B directly in hardware, keep the pathlength as short as possible, and let CPI suffer, and cycle-time also-but hopefully not too much. Again, region C has no meaningful interpretation in the pure CISC philosophy.

Many realistic commercial machines are much more accurately depicted as in the basic FIG. 1a. The architecture has a RISC core (e.g., LOAD, ADD, BRANCH), as in region A. In a real product architecture, there are also some less-aesthetic realities that have to be dealt with by instructions represented in region B. In a CISC architecture, instructions in region B could be separated into 3 categories: 1) algorithmically complex instructions (e.g., floating-point, decimal, translate, etc.); 2) multicycle versions of the RISC-core (e.g., load-multiple, move character, etc.); and 3) system-level operations (e.g., invalidate page-table entry, signal processor, start I/O, etc.).

In a pure CISC implementation, the region-B instructions would be implemented directly in hardware. In an actual product, however, some of these instructions would be too difficult to achieve in hardware, and many of them could not be done correctly the first time. The region B instructions in the first two categories most probably could be implemented directly; the last category poses the challenge. To facilitate the implementation of the region B architecture, the microarchitecture implements a region C.

These region C instructions are usually simple instructions that are not directly relevant to the instruction-set architecture (otherwise they would be region A instructions), but that manipulate hardware states required to facilitate the operations indicated by region B instructions. For example, region C instructions might be able to directly examine status bits that are not defined in the architecture, but which facilitate the performance of some high-level function.

Therefore, a real microarchitecture comprises RISC-like instructions of two types: A) which operate on architected state, and C) which operate on architected and nonarchitected state. The implementation of architected instructions B is done by invoking routines that are written using instructions of types A and C. These routines can be millicode routines or microcode routines. The distinction is that microcode instructions execute directly, while millicode instructions might execute directly or they might invoke microcode routines.

In either case, the millicode or microcode is considered to be part of the hardware. In general, it is not made visible to the software-the software should not be able to tell whether an instruction that it issues is executed directly by hardware, or is done as a millicode or microcode routine-nor should it care.

Note that the microarchitecture instructions in region C are not generally put there to enhance performance. Instead, they are put there deliberately to facilitate the functional implementation of architected instructions in region B. This is an important point, and we will return to it later.

Figure 1D:
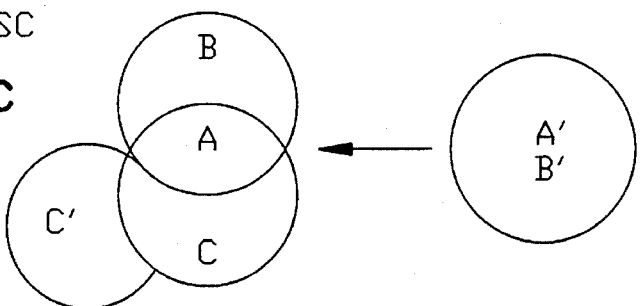

Semifinally, consider FIG. 1d, which depicts emulation. In this case, there is an architecture (AB) that is implemented by a real machine (ACC'), and we wish to make that machine appear to be a different architecture (A'B'), i.e., we wish to emulate architecture (A'B') with machine (ACC').

Realistically, if (AB) and (A'B') are "very different," the job is arbitrarily hard. If they are similar, then the job is possible. Realistically, some of the job must be done in software. If C' did not exist-meaning that machine (AC) was not built with any forethought of emulation-then all of the job must be done in software. Otherwise, C' is implemented-with forethought-to facilitate emulation. Once again, note that neither C or C' are put there to enhance performance; they are put there just to facilitate function.

Figure 1E:
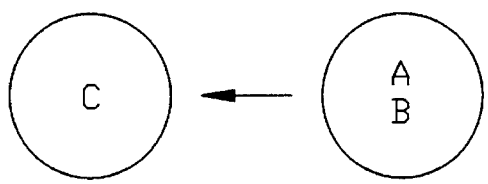

And finally, FIG. 1e shows an abstraction of emulation, where the balloons are disjoint. This figure probably does not represent anything real; it is more of a textbook example, or toy concept. Here, C is a "generic microarchitecture," which does nothing directly useful in-and-of itself, but C can emulate any target architecture, in this case, (AB).

Figure 2:
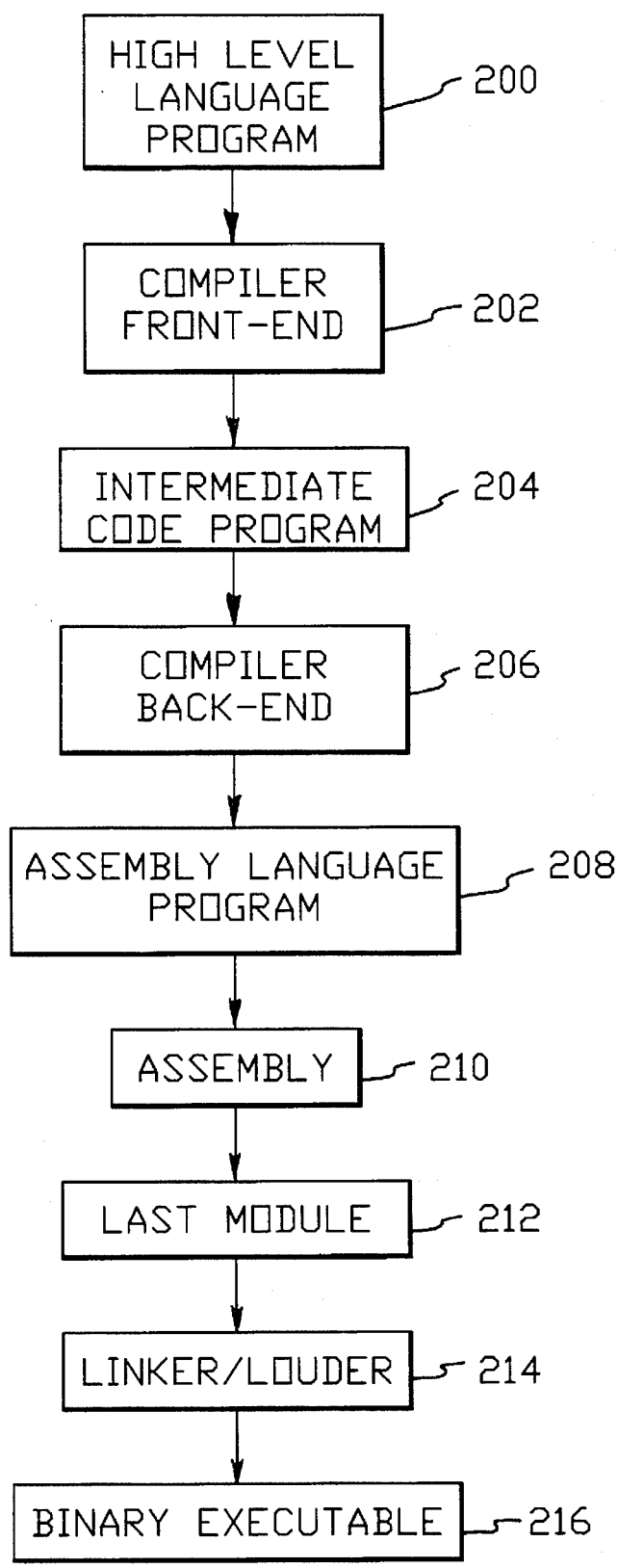
FIG. 2 is a flow diagram describing the logical relationship between high level source code and a binary executable file.

FIG. 2 shows the levels of translation between computer programs written in high level languages (HLLs), block 202, and the executable binary code that is eventually decoded and executed by the hardware, block 216. Note that this executable binary code is the binary form of the instruction sequence that is to be executed, where those instructions belong to the instruction-set architecture of the machine that will execute the code.

Examples of HLL's are Fortran, Cobol, PL1, Pascal, C, C+, etc. These languages were not designed with specific hardware in mind; on the contrary, they were designed to facilitate the "natural" expression of an application by a programmer. The goal of HLL design is not (primarily) high performance; the goal is programmer productivity.

Each HLL has its own compiler. The compiler is a program that translates a HLL program into an "equivalent" program that is written in the language of a particular machine's instruction-set architecture.

Generally speaking, a compiler is considered to have a "front end," block 202, and a "back end," block 206. The front-end of the compiler translates the HLL program into a generic "intermediate code," block 204. This intermediate code captures all of the semantic intent of the original program; it might represent the flow-graph of the program in tree form, and it has fabricated symbolic representations for the various data elements that are operated on. In general, this code is not directly executable by any real machine. Note that compilers for different HLLs might or might not translate programs into the same intermediate code format.

The back-end of the compiler translates this intermediate code into the "target architecture." The target architecture is the instruction-set architecture of the machine on which the program is to run. Note that each compiler must have a different back-end for each target architecture that is supported. In this case, the advantage of having different HLL compiler front-ends translate to the same intermediate code format, is that the different HLL compilers can then all use the same back-end. As was mentioned, this is sometimes done, but not always.

Much of the back-end translation is done via "macro expansion." Simply put, this means that many intermediate-level instructions are not really translated. Instead, a simple substitution is done; a pre-written instruction sequence in the target architecture is simply substituted for the intermediate-level instruction. The significance of this point will become apparent layer.

The output of the compiler back-end is assembly language, block 208. Assembly language is merely a mnemonic representation of an instruction-set architecture. It is easier for a human to read assembly language than a binary executable. Strictly speaking, there are a few other differences as well. For example, memory locations and names of operands are represented mnemonically instead of numerically. This is done both because it is easier to read, and because some of these numbers will not be determined until the code is loaded into memory to be executed. For example, the target address of a branch cannot be determined unless you know where the code resides.

The assembler translates the assembly language into its binary form, with those things that cannot be resolved left for the linker/loader. This translated assembly language is called a "load module," block 212. The load module can be kept in this form forever, i.e., once a load module is created, there is no reason to go through compilation and assembly again. The only reason to recreate a load module is if the source HLL program is updated (modified) for some reason, or if a new module is required for a different target architecture. In customer environments, there are decades-old load modules that are still used routinely. In some cases, the original source HLL no longer exists, and there is no one around who remembers what the source really did. This is one of the reasons that upward compatibility must be maintained as an architecture evolves over decades.

When the application is to be run, the linker/loader (block 214) takes the load module, links it to whatever routines it will interact with (as specified in the load module), and using the address at which the module is to be loaded, it does a final resolution of labels (symbolic addresses) within the module. The output of the linker/loader is called executable binary, block 216. This executable binary is loaded into a specific place in memory where it can be decoded and executed by the processor whose architecture was used to create the assembly code.

To a hardware designer, the load module represents the "software interface." That is, the hardware interpretation mechanisms (decoders, etc.) are designed to recognize the binary representations that are in the load module; specifically, the instruction-set architecture. Stated more concisely, as seen by the hardware, the instruction-set architecture is the software interface.

This interface must be preserved and unchanged no matter what changes are made to the microarchitecture. Next-generation's machines must be able to run today's load modules without a hitch. Those load modules contain only those instructions that are part of the architecture today. Enhancing that architecture (i.e., adding new instructions) for the next generation machine will not help existing modules; for that matter, since assemblers do a rather mundane translation, it will not help existing assembly language programs.

THE PROBLEM SOLVED BY THIS INVENTION

When one considers the set of translations between a HLL program, and the final hardware/software interface, a.k.a "target architecture," it is apparent that a load module comprises a sequential set of primitive operations (architected instructions) that implement a more complex operation (high-level-language construct). At the software interface, the assembly-language program is limited to the expression of those operations that define the architecture.

It has been observed that there are certain fundamental sequences of instructions that appear repeatedly regardless of the module in question. These sequences arise largely from macro expansion in the compiler back-end. These sequences implement commonly used programing constructs that are not directly expressible in the target architecture.

As technology improves from one generation to the next, certain things become feasible to do in hardware that were not feasible in prior generations. If it is feasible to do something in hardware, and that thing is useful to an application set, then if one were designing a new architecture, that operation would be included as an instruction in the new architecture.

Examples of things that might be included in a new architecture following an improvement in hardware technology would arise from three basic things:

1. Operations that were always possible to do simply, but which had not been included in a prior generation's instruction set due to a lack of foresight or a lack of available encodings. An example might be the instruction "clear register," which is trivial to implement in hardware, but which does not exist in many legacy architectures. In these architectures, this operation is performed by subtracting the register from itself. The hardware that executes this may actually use an execution unit, and tie-up data paths in the machine to do it.

2. More parallel ports coming out of register files and/or caches would facilitate compound or disjoint operations that involved many operands. This would include 3-address or even 4-address instructions, and it would also include disjoint instructions done in parallel, e.g., VLIW instructions.

3. As a special case of the previous point, the ability to build multiple parallel execution units would facilitate the execution of multiple disjoint— or even chained—operations in parallel. Again, VLIW instructions are an example, as are compound vector chains.

FIG. 3 shows a Venn-diagram depiction of various architecture extensions. If a designer was designing a new architecture, and faced no compatibility issues, the result would be FIG. 3a. This is the same as FIG. 1a; it is merely a generic picture of an architecture with its supporting microarchitecture. This was discussed above.

Figure 3A:
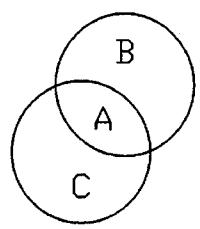
FIGS. 3a, 3b, 3c and 3d are Venn diagrams describing possibilities for designing a new architecture.
Figure 3B:
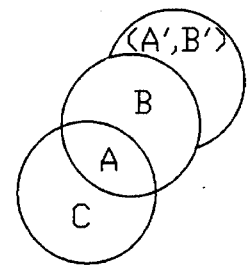

If a designer had to be upward compatible to an existing architecture, then FIG. 3b would result. This shows the legacy architecture (regions A and B) with new instructions (A'B') added to the instruction set. In this case, the software interface has been extended. The software interface can still run legacy load modules. The legacy load modules cannot benefit from the architected extensions because they do not contain any of the new instructions (A'B'). But newly created modules can use the new instructions. The new architecture is then defined by (ABA'B'). FIG. 3b depicts the evolution from IBM 360 architecture to 370, to 370 XA, and to ESA 390 architectures.

Figure 3C:
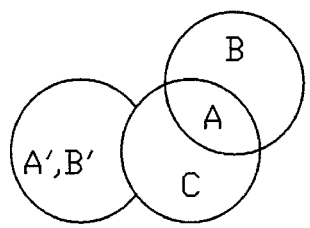

FIG. 3c shows something new. In this case, the software interface is not changed at all. Instead, the new instructions (A'B') are added to the new machine's microarchitecture. To the software, the new machine looks exactly like the old machine, that is, the architecture is still defined by (AB).

How is this useful? If the software does not know about instructions (A'B'), and it does not use them, then what good are they?

This is the problem that is solved by this invention. This invention provides a means and method for using new instructions in a way that is completely transparent to the software interface. This allows for an architecture to be extended for next generation's performance without impacting the software interface. This means that software compatibility issues will not be the inhibitor to architectural evolution.

In fact, the "clean" aesthetic solution that has the highest performance is the "clean-slate" approach of FIG. 3a. But this approach requires an absolute abandonment of all software developed to date. In an established market, this is just not practical.

FIG. 3b shows what has been done in the past. The legacy software is not abandoned, but it doesn't benefit from the new architectural improvements. Further, those architected extensions invariably have some side-effects when used on a legacy operating system with a mixture of new and old applications. And unfortunately, if the extensions are successful, then the next legacy becomes (ABA'B'), i.e., there will be even more "baggage" to deal with in future generations. Once A'B' is added to the architecture, it cannot be deleted.

FIG. 3c has never been done. It allows the architectural extensions to be made in the hardware. The extensions are not quite as easy to use as in FIGS. 3a and 3b, but FIG. 3c has three distinct advantages over the other approaches:

1. There is no impact to the existing software.
2. The existing software will benefit from the extensions.
3. The extensions can be deleted (because of #1) in a future generation if it makes sense to delete them, i.e., they do not become "baggage" that must be carried throughout eternity.

Figure 3D:
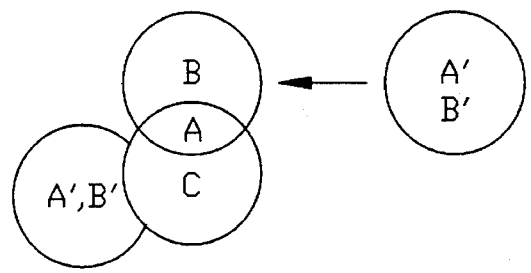

Finally, FIG. 3d shows an application of this idea that facilitates emulation. This is very important today because the computer industry is now being strongly driven by development cost. It is not cost effective for a company-or an industry--to support multiple architectures, and multiple processor development efforts. It would be very cost effective if a machine, M, built for one architecture X, having instructions (AB), could emulate a different architecture Y, having instructions (A'B'). This would allow machine M to run applications that were developed for Y. Perhaps even more important, if X fell by the wayside, and Y became the standard, then machine M, which might be a great machine, would not be a wasted effort. In fact it would adhere to standard Y. This can be done if the microarchitecture of M supported (A'B'), as shown in FIG. 3d.

Note that FIG. 3d looks a lot like FIG. 1d. The difference is that in FIG. 1d, the assumption was that (AB) and (A'B') were similar, otherwise it was not possible to do it. In FIG. 3d, the two architectures do not have to be at all similar, as long as (A'B') is part of the microarchitecture of the machine.

The Invention

This invention is a facilitator. It facilitates the generic extension to or alteration of an existing architecture without extension to or alteration of the software interface. Previously, the terms "instruction set architecture," and "software interface" were synonymous. This invention allows them to be different. The benefit is threefold:

1. There is no impact to the existing software.

2. The existing software will benefit from the extensions.

3. The extensions do not have to become legacy.

Figure 4:
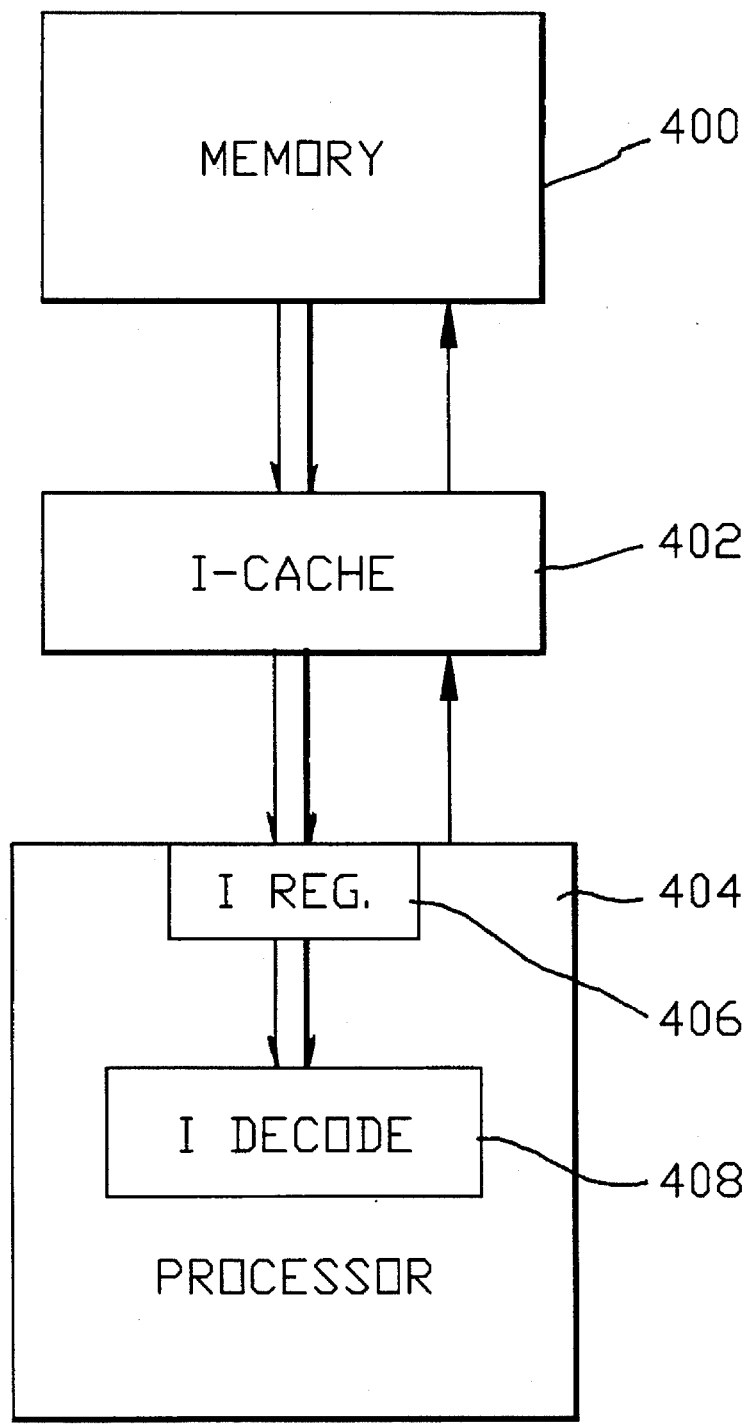
FIG. 4 is a schematic diagram representing a prior art main memory and cache system.

This facilitation is performed in one of three ways. First, consider from existing art the way in which an instruction stream is fetched from a memory system and executed by a processor. This is shown in FIG. 4.

The memory 400 contains instructions and data. That part of the instruction stream that has been active most recently is resident in a smaller but faster instruction-cache ("I-cache") 402. If the processor 404 tries to fetch an instruction that is not in the I-cache, a cache miss occurs, and the line (group of instructions) that contains the referenced instruction is moved from the memory 400 to the I-cache 402, where it replaces another line of instructions.

Most instruction references result in cache hits. That is, most of the referenced instructions are found in the I-cache. When the processor references an instruction, the instruction is fetched from the I-cache and put into an instruction register 406. The instruction-processing decoder 408 in the processor decodes the instruction directly from this register. Recall that the instruction-processing hardware of the processor 404 can directly decode and execute any instructions within the processor's microarchitecture. Architected instructions that are not within directly implemented by the microarchitecture (region B in FIG. 1a) are nonetheless recognized by the instruction-processing hardware, which triggers the appropriate millicode or microcode sequence.

The usefulness of the system and method of the present invention can be illustrated with reference to an example. Suppose an architecture defined by an instruction set comprising six instructions: A, B, C, D, E and F. Suppose further a hardware microarchitecture capable not only of executing instructions A, B, C, D, E and F, but also compound instructions {A,B,C}, {A,C,E}, {B,D,E}, {F,B} and {C,B,F}, each as a single operation. These compound instructions may be referred to herein as "primary instructions." (This invention can be extended generically to the translation of instructions of a first semantic type to one or more instructions of a second semantic type.) These compound instructions will be denoted $x_1$, $x_2$, $x_3$, $x_4$, $x_5$ and $x_6$, respectively (Table 1). These instructions represent functional, rather than physical, compounds of the corresponding combinations of old architecture instructions. That is, the size of the compound instruction $x_1$, in bits, may be the same as that of instruction A. Thus, the compound instructions may merely be additions to the instruction set to simplify operations that previously required a plurality of instructions to implement.

TABLE 1

| (1) OLD ARCHITECTURE INSTRUCTIONS | (2) NEW ARCHITECTURE (PRIMARY) INSTRUCTIONS | (3) COMPOUND OLD ARCHITECTURE INSTRUCTIONS |
|---|---|---|
| A | $X_1$ | {ABC} |
| B | $X_2$ | {ACE} |
| C | $X_3$ | {BDE} |
| D | $X_4$ | {FB} |
| E | $X_5$ | {CBF} |

Now further assume a sequence of microinstructions as shown in Table 2. These microinstructions are sequentially labelled (1)–(18), indicating, for the purpose of illustration, the addresses of these instructions. As can be seen, the sequence of instructions includes several groupings of microinstructions comprising the compound instructions of Table 1, Column (3). The microinstructions comprising these groups can be executed individually to achieve the desired purpose, but then the full advantage of the extended architecture will not be realized. Thus, in accordance with the present invention, means are provided for translating sequences of old architecture instructions, if possible, into corresponding compound instructions executable under the extended architecture. It is clear that this allows existing programs to benefit from the extended architecture in a way that is invisible to the architecture interface. To the architecture interface, it appears that the load module (which was constructed under the assumption that the prior architecture is in use) is being executed by the old architecture. But because many groups of instructions in the load module may actually execute in only a fraction of the number of operations required under the previous architecture, execution will be significantly faster.

TABLE 2

| (1) PROGRAM | (2) ADDRESS | (3) TRANSLATION | (4) ORIGINAL SEQUENCE LENGTH |
|---|---|---|---|
| A | (1) | $X_1$ | 3 |
| B | (2) | — | — |
| C | (3) | — | — |
| A | (4) | $X_1$ | 3 |
| B | (5) | — | — |
| C | (6) | — | — |
| B | (7) | $X_3$ | 3 |
| D | (8) | — | — |
| E | (9) | — | — |
| F | (10) | — | — |
| E | (11) | — | — |
| B | (12) | $X_3$ | 3 |
| D | (13) | — | — |
| E | (14) | — | — |
| C | (15) | — | — |
| C | (16) | $X_5$ | — |
| B | (17) | — | — |
| F | (18) | — | — |

In accordance with the present invention, the translation process is performed by a translation engine, the operation of which will now be described.

FIG. 8 shows a simplified finite state recognizer ("FSR") which examines incoming instructions to determine whether any sequence of old architecture instructions corresponds to a primary instruction under the new architecture (from Table 2). The FSR begins at state 0. If the first instruction is instruction D, for instance, the FSR returns to state 0 because none of the compound instructions in Table 2 begins with instruction D. Thus, there can be no translation that includes this first instruction. The FSR then waits for a second instruction. If the second instruction is, for instance, instruction A, the state of the FSR will change to "First A". If the third instruction received is B, the state of the FSR will change to "AB". If the third instruction would yield an impossible combination, such as instruction D, the FSR would return to state 0. If the current state is state AB, and if the fourth instruction is instruction C, the FSR will produce an output of $x_1$, indicating that the preceding three "old" architecture instructions can be translated into new architecture instruction $x_1$, and store it in an appropriate memory location. The FSR then returns to state 0 to examine subsequent incoming instructions. FIG. 8 also shows the states for translating sequences into the other new architecture instructions. The results of the translation operation performed on the instructions of Table 2, column (1), are listed in Table 2, column (3).

Table 3 shows an interesting result of the above process (although the FSR needed to produce the results in Table 3 will be more complex than the one shown in FIG. 8). Column 1 lists the incoming old architecture instructions. The translator will translate the first three instructions into new architecture instruction $x_1$ (i.e., A,B,C) as beginning at address 100 and having an instruction "length" of three, but it will also recognize instruction $x_5$ (i.e., C,B,F) as beginning at instruction 103, and translate accordingly. Thus, instruction C at address 102 will form part of a first sequence (instructions 100–102), translated as $x_1$, and also part of a second sequence beginning at address 102, translated as $x_5$ (instructions 102–104). The effect of this translation is that a branch to instruction address 100 would cause $x_1$ to execute; a branch to instruction address 101 would cause B to execute; and a branch to instruction address 102 would cause $X_5$ to execute. Thus, a single old architecture instruction may constitute part of one or more translations.

TABLE 3

| (1) OLD ARCHITECTURE INSTRUCTIONS | (2) AD- DRESS | (3) TRANS- LATION | (4) INSTRUCTION LENGTH |
| --- | --- | --- | --- |
| A | (100) | $X_1$ | 3 |
| B | (101) | — | — |
| C | (102) | $X_5$ | 3 |
| B | (103) | — | — |
| F | (104) | — | — |

The FSR of FIG. 8 can be implemented in the conventional fashion for implementing finite state machines. That is, it can either be hardware or software driven. In a preferred embodiment, the FSR will be implemented in hardware using. If implemented in software, the FSR can be implemented as a processor operating on an appropriate set of instructions, in the same manner as a lexical analyzer, e.g., which is well known in the art of compiler operation.

The result of the translation will be the generation of a translated instruction, along with a length code representing the number of "old" architecture instructions corresponding to the translated version, as shown in Tables 2 and 3.

FIG. 5 shows a first preferred embodiment of the invention. The system of FIG. 5 includes a memory 500 for storing data and instructions. The memory is coupled to an I-cache 502, which stores sequences of frequently-used instructions. A second cache memory, extension-instruction cache ("EI-cache") 504 is coupled to the memory 500 via a translator engine ("TE") 506. The TE 506 performs the translation of sequences of multiple old architecture instructions into new architecture instructions (region A'B' in FIG. 3c and 3d). The EI-cache is used to store a series of previously encountered instructions, as in the case of a typical cache, but with one or more new architecture instructions replacing appropriate sequences of the original instructions. Thus, in the embodiment of FIG. 5, the EI-cache and the I-cache may contain functionally identical sequences of code. The difference is that the instructions in the EI cache can more efficiently be executed by the processor 508, since some of the original architecture instructions have been replaced with compound instructions from the new architecture. In a preferred embodiment, untranslated instructions will be stored only in the I-cache.

The EI-cache 504 and the I-cache 502 are coupled to a processor 508 via data lines 510 and 512, respectively. The caches are also coupled to the processor via address line 514, through which the processor requests needed instructions beginning at a specified address.

The system of FIG. 5 operates as follows. The processor requests an instruction, by address, from the I-cache via line 514b and the EI-cache via line 514a. If an I-cache and EI-cache miss occurs, as indicated by the failure of both the I-cache and the EI-cache to return valid data to the processor, the I-cache will request the appropriate instruction line from memory 500 via line 516. The memory 500 responds by moving the requested instruction line to the I-cache, via line 518a, and also to the TE 506, via line 518b. The I-cache 502 will then send the requested instruction to the processor's instruction register 520 via line 512. The requested instruction will then be decoded in decoder 522 for processing. In the mean time, the TE 506 analyzes the instructions in the line it received, searching for instruction sequences written in the original architecture that are translatable to an architectural extension. This analysis proceeds as described above with respect to FIG. 8. If the TE 506 finds a translatable sequence, it performs the translation and stores it in the EI-cache 504 at the address of the first instruction in the translated sequence, along with a length code indicating the length of the sequence translated. That is, the EI-cache will store the equivalent of the translated sequence of instructions, beginning at the same address.

The benefit of performing the translation and storing it in the EI-cache will now become apparent. If the processor subsequently asks for the same instruction it previously requested, the request will pass to both the I-cache, via line 512, and to the EI-cache, via line 514a. If there is a valid instruction in the EI-cache, then that instruction from the EI-cache will be loaded into I-reg 520; if there is no valid instruction in the EI-cache, then the fetch will proceed as above. Thus, to the extent that the TE 506 was able to find good translations and cache them before they are needed, the implementation of FIG. 5 allows the hardware to use the extended architecture.

FIG. 6 shows a second preferred embodiment of the present invention. This embodiment includes a memory 600 coupled to a processor 608 via I-cache 602. The output of an EI-cache 604 is coupled to the processor 608. The output of the I-cache is also directed to TE 606 via line 612b. The output of TE 606 passes to the EI cache 604.

The embodiment of FIG. 6 operates as follows. When processor 608 requests an instruction (via address line 614b) from the I-cache 602, and if a cache miss occurs, then the I-cache will forward the request to the memory 600 via line 616. The memory will respond by sending the requested line of instructions to the I-cache via line 618. The cache will store the line for a possible later request and also forward the requested instruction to the processor via line 612, where the line will be stored in I-reg 620, and subsequently decoded in decoder 622. The I-cache 602 will also simultaneously forward the requested instruction to the TE 606. The TE will then attempt to translate the requested instruction sequence into one or more primary instructions under the new architecture (as described above with respect to FIG. 5), and store the primary instruction sequences in the EI-Cache 604.

As can be seen, address line 614, which branches off as address lines 614a and 614b, is sent to both the I-cache and the EI-cache. Thus, when the processor subsequently requests the same instruction, the EI-cache and the I-cache will each respond if they have the requested instruction. In such a case, priority will be given to the translated version stored in the EI-cache. This is similar to the operation of the embodiment of FIG. 5, except that the TE is not located between the memory and the EI-cache. In this case, the very first time an instruction sequence is encountered, it is run using the legacy architecture from the I-cache. While that legacy instruction sequence is being executed by the processor, the TE analyzes the sequence, and if a translation is found, then that translation is placed in the EI-cache. If the same instruction sequence is ever reencountered, then the translated version will be fetched from the EI-cache and executed by the processor.

A third preferred embodiment is shown in FIG. 7. This embodiment includes a processor 708 coupled to a memory unit 700 via I-cache 702. The processor 708 is coupled directly to the I-cache via line 712 and also via TE 706 and storage queue 704.

In this embodiment, there is no EI-cache, and the TE 706 is more sophisticated than the translation engines described above, in that the TE 706 includes means for prefetching instructions prior to the processor requesting such instructions, and for performing translations on-the-fly. This is accomplished as follows. When the processor 708 requests a line from I-cache 702 via address line 714b, the I-cache will either respond by providing the requested instruction, or if there is a cache miss, by requesting the appropriate instruction from main memory 700, and then forwarding the instruction (after receiving it from the main memory) to processor 708 via line 712. In either case, the I-cache will also provide the requested instruction to TE 706 via line 713. TE 706 will then attempt to translate the instruction, as described previously, and will store the results in queue 704, which in preferred embodiment is a FIFO buffer. In this embodiment, the TE also includes an instruction-prefetch ("I-prefetch") mechanism 707, which in a preferred embodiment is a branch history table, which will enable it to anticipate the sequence of instructions that will most likely be fetched by the processor in the immediate future. The TE will prefetch this anticipated sequence, and decode the instructions without actually executing them. The decode provides additional information that is useful for driving the prefetch process. Prefetch requests are issued via line 709 to the I-cache, and the prefetched instruction stream will be provided to the TE by the I-cache via line 706.

Because it is faster to decode the instructions for prefetch purposes than to decode and execute the instructions in the processor, the TE and prefetch mechanism typically can work faster than, and therefore "stay ahead of", the processor. That is, the TE does not actually execute the instructions, it merely examines them, translates them (if possible), and tries to stay ahead of the processor. Since it is not actually executing instructions or fetching operands, it can usually stay at least several instructions ahead.

The translated prefetched instructions are stored in queue 704. When the processor has processed an instruction, and has come to a point where it is ready to receive further instructions, it will request the next instruction simultaneously from queue 704 via address line 714a, and from I-cache via line 714b. If the TE has been successful in staying ahead of the processor, in which case a translated instruction can be found on the queue, the requested instruction will be sent to the processor from the queue via line 723. If the instructions can not be found in the queue, the instructions will be provided to the processor by the I-cache via line 712.

Another embodiment of the invention is shown in FIG. 9. This embodiment includes a processor 908 coupled directly to a memory unit 900 via data bus 902. The processor 908 is coupled to a queue 904 via line 912.

In this embodiment, there is no EI-cache or I-cache, and the TE 906 includes means for prefetching instructions prior to the processor requesting such instructions, and for performing translations on-the-fly, as previously described with respect to FIG. 7. The circuit operates as follows. When processor 908 requests an instruction via line 914, the request will be delivered to both the memory 900 and the queue 904. The queue 904 and the memory 900 will each respond with a message indicating the respective availability status of the requested instruction. In the case of the queue, the instructions provided (if available) will have previously been translated into the new architecture. In the case where the requested instruction is not available from the queue, the instruction will be loaded from main memory into both the TE 906 and the processor via line 902. While the processor operates on this instruction, TE 906 will attempt to translate the instruction, as described previously, and will store the results in queue 906. The translated instruction will then be decoded in the I-prefetch mechanism 907 (e.g., a branch history table) and prefetch requests will be issued via line 909 to the main memory. The prefetched instruction stream will be provided to the TE via line 902.

Again, because it is faster to decode the instructions for prefetch purposes than to decode and execute the instructions in the processor, the TE and prefetch mechanism typically can work faster than the processor.

The translated, prefetched instructions are stored in queue 904. When the processor has processed an instruction, and has come to a point where it is ready to receive further instructions, it will request the next instruction simultaneously from queue 904, and from memory 908. If the TE has been successful in staying ahead of the processor, the requested instruction will be sent to the processor from the queue. If the instructions can not be found in the queue, the instructions will be provided to the processor by the main memory.

While the invention has been described particularly with respect to preferred embodiments thereof, it will be understood by those skilled in the art that modifications to the disclosed embodiments can be effected without departing from the spirit and scope of the invention.

I claim:

1. A method for translating a series of one or more instructions of a first semantic type into one or more instructions of a second semantic type, comprising the steps of:

providing a first memory;

providing a second memory;

translating a sequence of instructions of the first semantic type stored in the first memory into one or more primary instructions of the second semantic type and storing the instructions of the second type in the second memory;

upon a request from the processor for the sequence of instructions of the first semantic type:

providing the corresponding instructions of the second semantic type if available in the second memory;

providing the sequence of instructions of the first semantic type if the corresponding instructions of the second semantic type are not available in the second memory.

2. The method of claim 1, further comprising:

providing a third memory;

storing the sequence of instructions of the first type in the third memory.

3. The method of claim 2, wherein the step of translating is performed before moving one or more instructions of the first type from the third memory to the processor.

4. The method of claim 3, wherein the step of translation is performed after instructions are moved from the third memory to the processor.

5. The method of claim 1, wherein the translation is performed prior to the request for the sequence of instructions.

6. The method of claim 2, wherein the step of providing the sequence of instructions of the first type to the processor is performed by the third memory.

7. The method of claim 6, wherein the processor requests the sequence of instructions by sending an address signal to the second and third memory via an address bus.

8. The method of claim 4, wherein the second memory is a storage queue.

9. An apparatus, comprising:

a first memory;

a second memory;

a processor;

means for translating a sequence of instructions of a first semantic type stored in the first memory into one or more instructions of a second semantic type and for storing the instructions of the second type in the second memory;

means, upon a request from the processor for the sequence of instructions of the first semantic type:

for providing the corresponding instructions of the second semantic type if available in the second memory; and for providing the sequence of instructions of the first semantic type if the corresponding instructions of the second semantic type are not available in the second memory.

10. The apparatus of claim 9, wherein the means for translating is a translation engine.

11. The apparatus of claim 10, wherein the translation engine is coupled between the first memory and the second memory, and the means for delivering the primary instruction to the processor comprises a first data bus coupling the second memory and the processor.

12. The apparatus of claim 11, further comprising a third memory coupled to the first memory via a second data bus, and coupled to the processor by a third data bus.

13. The apparatus of claim 12, wherein the third memory is coupled to the translation engine via the third data bus, the third data bus constituting an input to the translation engine.

14. The apparatus of claim 13, wherein the translation engine is coupled to the second memory via a fourth data bus, the fourth data bus comprising an input to the second memory.

15. The apparatus of claim 12, wherein the translation engine is coupled to the first memory via the second data bus, the second data bus comprising an input to the translation engine.

16. The apparatus of claim 12, further comprising means for fetching an instruction prior to the processor requesting the instruction.

17. The apparatus of claim 16, wherein the means for fetching comprises a branch history table coupled to the translation engine.

18. The apparatus of claim 9, wherein the first memory is a system main memory having a first access speed.

19. The apparatus of claim 18, wherein the second memory is an extended instruction cache memory having an access speed faster than the access speed of the main memory.

20. The apparatus of claim 18, wherein the second memory is an instruction queue.

21. An apparatus, comprising:

a main memory;

an instruction cache memory coupled to the main memory via a first bus;

a processor coupled to the instruction cache memory via a second bus;

an address bus connecting the processor and the instruction cache memory for delivering instruction request signals from the processor to the instruction cache;

means responsive to the instruction request signals for transferring requested instructions from the instruction cache memory to the processor if the requested instructions are stored in the instruction cache memory;

means responsive to the instruction request signal for transferring the requested instructions from the main memory to the processor via the instruction cache memory if the requested instructions are not stored in the instruction cache memory;

a translation engine coupled to receive instructions output from the instruction cache memory via the second bus;

a storage unit coupled to receive translated instructions corresponding to the requested instructions from the translation engine;

means responsive to the instruction request signal for transferring the translated instructions stored in the storage unit to the processor.

22. The apparatus of claim 21, wherein the stored unit is a first-in, first-out buffer.

23. An apparatus, comprising:

a main memory;

an instruction cache memory coupled to receive outputs from the main memory;

a translation engine coupled to receive outputs from the main memory;

an extended instruction cache coupled to receive outputs from the translation engine;

a processor coupled to receive outputs from the instruction cache and from the extended instruction cache;

means for delivering instruction request signals from the processor to the instruction cache and to the extended instruction cache;

means for translating a plurality of instructions, conveyed to the translation engine via the second bus, into one or more primary instructions;

means for storing the plurality of instructions in the instruction cache;

means responsive to the instruction request signal for conveying the one or more primary instructions to the processor, if the primary instructions exist;

means responsive to the instruction request signal for conveying the plurality of instructions from the instruction cache memory to the processor if no primary instruction corresponding to the plurality of instructions exists.

* * * * *